3,033,238
POLYETHYLENE CONTAINERS
John S. Kosewicz, Monroe, La., assignor to Commercial Solvents Corporation, New York, N.Y., a corporation of Maryland
No Drawing. Filed Feb. 5, 1960, Ser. No. 6,873
5 Claims. (Cl. 138—141)

My invention relates to polyethylene containers. More particularly, it relates to polyethylene containers suitable for holding potable water.

The increasing cost of metals has led to the development of many metal substitutes such as plastics which possess many of the desirable properties of metals, yet can be manufactured at a much lower cost. One very extensive use for metals, especially ferrous metals, is in pipe for potable water. It has been suggested that various plastics be used as substitutes for metal pipe for carrying potable water. The advantages of using plastic pipe instead of ferrous metals are numerous. Among these advantages are lightness of the material, inertness to solutions and atmospheres that are corrosive to metals, flexibility which permits the plastic to be coiled and shipped in long lengths which can be laid directly without the cost or trouble of coupling, strength and durability.

The use of polyethylene for pipe has not previously been deemed commercially practical because of the relatively high cost of the material and because its properties were such the pipe had only very limited applicability. Recently, however, it has been discovered that a highly suitable and inexpensive polyethylene useful for pipe production can be made by cross-linking polyethylene and blending the cross-linked material with substantial amounts of carbon black. Cross-linked polyethylene has increased heat resistance and can be obtained by any convenient method such as described in U.S. Patent 2,916,481 and U.S. Patent 2,826,570. When the cross-linked polyethylene is combined with carbon black in amounts as high as four parts carbon black to one of polyethylene by weight the resulting product has increased hardness and tensile strength making it particularly suitable for pipe. However, pipe and containers of cross-linked, carbon black loaded polyethylene cannot be used for potable water since the cross-liking agents have been found to dissolve in the water imparting a noxious taste thereto and rendering the water unpotable.

I have now discovered a polyethylene container including pipe which makes use of the cross-linking and carbon black loading features but which can also be used for potable water systems. My new product is conveniently and economically produced and finds ready applicability in all areas where polyethylene containers including pipe have previously been employed, as well as in potable water systems.

My new invention consists of containers including pipe made from cross-linked polyethylene loaded with carbon black having an inner liner of uncross-linked polyethylene. The uncross-linked polyethylene liner of my new containers does not allow passage of cross-linking agents such as dicumyl peroxide, 2-butylpentamethylethyl peroxide, 2,5 - bis(tert.-amylperoxy) - 2,5 - dimethylhexane, and the like, through it, thereby enabling the use of the relatively inexpensive carbon black loaded, cross-linked polyethylene in containers for holding and transporting potable water. Furthermore, the use of my uncross-linked polyethylene liner does not detract from the general usefulness of cross-linked polyethylene pipe because of the homogeneous properties of the cross-linked and uncross-linked material and the great adhesion between them.

I can produce the cross-linked polyethylene containers of my invention having an uncross-linked polyethylene liner by any suitable method. One such method for making pipe consists of extruding the pipe of uncross-linked polyethylene and then extruding on top of it a tube of cross-linked polyethylene. Another method consists of placing a pipe of uncross-linked polyethylene inside a pipe of cross-linked polyethylene and heat fusing the two parts. The liner for my cross-linked polyethylene container can be of any desired thickness. I prefer, however, to use an inner liner of uncross-linked polyethylene of about 0.025 inch.

The following example is offered to illustrate the usefulness of my invention. It is apparent from the description above that articles other than pipes such as buckets, troughs, etc., can be made from the material of my invention. It is therefore understood that my invention is not limited by the articles, amounts and materials indicated, and procedures, materials, and proportions which are obvious to anyone skilled in the art are to be considered as within the scope of my invention therein.

*Example 1*

A circular slab of carbon black loaded cross-linked polyethylene in which the cross-linking agent was dicumyl peroxide was heat fused to a layer of uncross-linked polyethylene 0.025 inch thick. An inverted jar of water was then placed in contact with the uncross-linked side of the polyethylene and permitted to remain for 72 hours. At the end of the 72 hour period the water was analyzed for dicumyl peroxide and found to contain none.

Now having disclosed my invention, what I claim is:

1. A polyethylene container which comprises a cross-linked polyethylene container having an inner liner of uncross-linked polyethylene.
2. The container of claim 1 wherein the container is a pipe.
3. The container of claim 1 wherein the inner liner of uncross-linked polyethylene is about 0.025 inch thick.
4. A polyethylene container suitable for potable water systems which comprises a container of carbon black loaded, cross-linked polyethylene having an inner liner of uncross-linked polyethylene.
5. A polyethylene pipe suitable for potable water systems which comprises a pipe of carbon black loaded, cross-linked polyethylene having an inner liner of uncross-linked polyethylene, said liner being about 0.025 inch thick.

References Cited in the file of this patent

UNITED STATES PATENTS

| | | |
|---|---|---|
| 2,512,459 | Hamilton | June 20, 1950 |
| 2,520,737 | Romeyn et al. | Aug. 29, 1950 |
| 2,826,570 | Ivett | Mar. 11, 1958 |
| 2,932,323 | Aries | Apr. 12, 1960 |